२,८०३,७४०
Patented Aug. 20, 1957

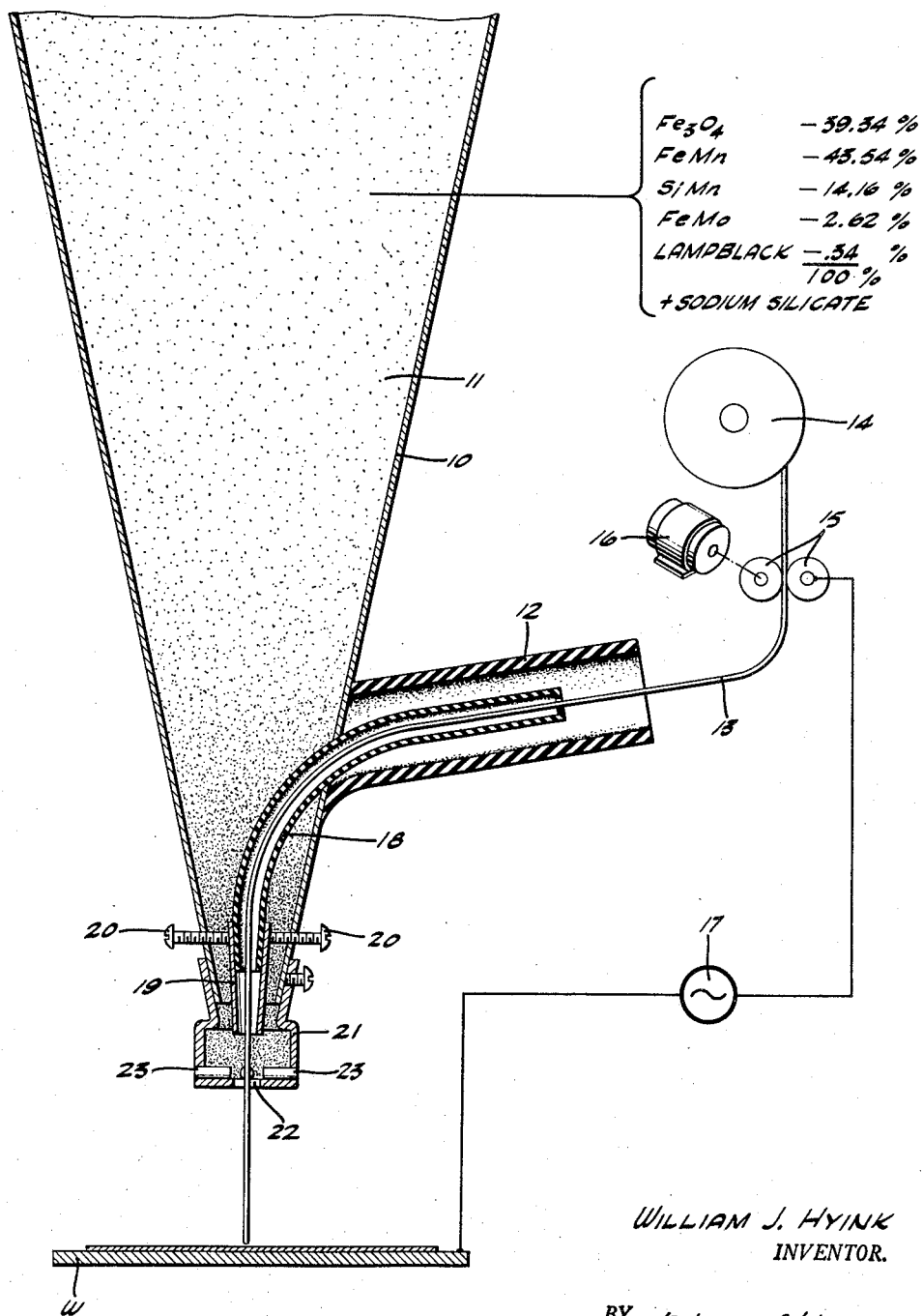

2,803,740

METHOD AND COMPOSITION FOR BUILDING UP AND SURFACING AUSTENITIC STEELS

William J. Hyink, Whittier, Calif., assignor to Stoody Company, Whittier, Calif., a corporation of California Application November 20, 1953, Serial No. 393,337

11 Claims. (Cl. 219—137)

This invention relates to a method and composition for building up and surfacing with austenitic steels.

Explanatory of the present invention, there has heretofore been developed a welding apparatus and procedure wherein an electrode in the form of a welding wire is fed through a hopper toward the work on which metal is to be deposited. The hopper has heretofore been filled with a finely divided composition commonly referred to as a "flux" because of its physical characteristics being similar to a flux. Actually, the composition has been designed to supplement the metal that is fed into the arc weld. The composition in the hopper is of a magnetic character and when an electric welding arc is drawn between the electrode or welding wire and the work the magnetic flux generated by the high amperage current passing through the electrode causes the magnetizable composition in the hopper to adhere to the wire and to be carried thereby as the wire is fed toward the work. In the bottom of the hopper there is an orifice through which the wire is fed and which regulates the amount of the composition that is temporarily coated on the wire due to its magnetic attraction thereto while the wire is conducting current. Adjacent this orifice there are permanent magnets which also attract the composition and which will hold the composition against dropping out of the hopper whenever the arc is broken and current is neither flowing through the electrode nor is the electrode being fed toward the work.

With this apparatus and this procedure the composition or "flux" heretofore used in the hopper has been designed to supplement a mild steel electrode in depositing mild steel on the work. It has been found that by magnetically coating the wire with the composition the rate at which metal can be deposited on the work can be greatly increased over the volume of deposited metal that is deposited with a simple mild steel wire in electric welding.

It is desirable to use the same apparatus and procedure to build up or to surface the work with an austenitic manganese steel due to the fact that many tools and pieces of equipment are either formed of such steel or are surfaced with such steel. Austenitic manganese steels of the type referred to herein are commonly referred to as Hadfield manganese steel and possess such desirable properties of toughness, adequate hardness, and the ability to work-harden. However, in order to provide a composition capable of being magnetically coated on a welding electrode and which when deposited on the work will produce an austenitic manganese steel, a number of problems are presented. These include the primary consideration that the composition must be one capable of being magnetized so that it will be magnetically attracted to the electrode or welding wire which carries the composition from the hopper to the work. In addition to this property of being magnetizable the composition must be such that it is capable of combining with the metal of the electrode to produce an austenitic manganese steel as distinguished from martensitic or pearlitic manganese steels.

There are other problems typical of good welding procedure which must be satisfied in order to have a satisfactory welding composition. Spattering of the deposit in the course of the welding is to be avoided. The typical ripple obtainable in conventional arc welding should be retained as much as possible. An adequate penetration and bonding between the deposited metal and the parent metal must be present. The deposited metal should be relatively free of blow-holes and slag on the deposit should be capable of being readily removed without clinging. An adequate viscosity is also desirable while the metal is molten.

A primary object of the present invention is to provide a method and composition for depositing austenitic manganese steels which will satisfactorily meet all of the above requirements so that an austenitic manganese steel can be deposited and the advantage of a fast or rapid deposit of metal or "build up" can be obtained.

With the foregoing and other objects in view, which will be made manifest in the following detailed description and specifically pointed out in the appended claims, reference is had to the accompanying drawing for an illustrative embodiment of the invention, wherein the figure is a schematic view of a form of apparatus with which the composition embodying the present invention may be advantageously employed.

In the figure there is illustrated a hopper indicated at 10 designed to be filled with a composition 11 embodying the present invention. This hopper may have a hollow handle 12 through which a welding electrode 13 is fed from an automatic electric welding machine. Parts of the machine are illustrated diagrammatically consisting of a supply roll 14 of electrode or welding wire which is fed toward the handle between rolls 15, at least one of which is power-driven, such as by a motor indicated at 16.

The generator for the electric welding machine is indicated at 17, one side of which is electrically connected to one of the rolls 15 and the other side of which is grounded on the work W. Within the handle and hopper there is disposed a guide tube 18 which leads through a guide 19 that is centered with relation to the hopper such as by adjusting screws 20. The bottom of the hopper is largely closed by a cap 21 in which there is an outlet orifice 22 through which the electrode 13 is fed toward the work.

Around the orifice 22 there are permanent magnets 23. These magnets serve to attract the magnetizable composition 11 and thus clog the orifice 22 so that the composition 11 cannot drop through the orifice when no current is passing through the electrode 13. However, whenever an arc is drawn between the end of the electrode 13 and the work W the high amperage current flowing through the electrode generates a magnetic flux which will attract the finely divided and magnetizable composition 11 to the surface of the electrode. The magnetic flux generated by this welding current is stronger than the magnetic flux generated by the permanent magnets 23. Consequently, as long as the arc between the electrode and the work W persists, a coating of composition 11 will be drawn by the electrode 13 through the orifice 22 and carried with the electrode toward the work. It will be appreciated that as long as the arc persists the electrode 13 will be continuously and evenly fed by the rollers 15 toward the work by the mechanism of an automatic electric welder.

When the apparatus as above described has been used heretofore the electrode 13 has been in the form of a mild steel wire. The composition 11 has been such as to supplement the mild steel of the wire and produce a mild steel deposit on the work W. The metal deposited which is metal derived from the electrode 13 itself and the metal derived from the composition in the hopper can be applied or deposited much more rapidly than if the electrode 13 alone is used.

The composition used to deposit austenitic manganese steels in accordance with the present invention has a preferred composition by weight as follows:

|  | Percent |
|---|---|
| Fe₃O₄ (coarse) | 39.34 |
| FeMn | 43.54 |
| SiMn | 14.16 |
| FeMo | 2.62 |
| Lamp black | .34 |
|  | 100.00 | to which is added sodium silicate (N brand) having a specific gravity of 42.2° Baumé and a ratio of alkali to silicate of 1 to 3.22.

In preparing this composition the iron oxide, ferromanganese, silicomanganese, and ferromolybdenum and lamp black are first thoroughly mixed together in a dry state. The iron oxide used preferably has a mesh size of 80 mesh and under. The ferromanganese has a mesh size of 40 and under. The silicomanganese has a mesh size of 30 to 40 and the ferromolybdenum has a mesh size of 30 and under. The lamp black, of course, is in the form of a powder. After these ingredients have been thoroughly mixed together sufficient sodium silicate is added to render the composition in the form of a heavy paste or putty that is to bind the various ingredients together in the form of a wet mass. While the amount of sodium silicate that is added may vary a typical proportion is in the ratio of 115 cc. of sodium silicate to 762.5 grams of the dry mix of the ingredients above mentioned. The composition is then spread on a suitable support, such as a steel plate, and thoroughly dried in an oven. The drying time and temperatures preferred are as follows:

1 hour at 250° F.
  2 hours at 500° F.
  1 hour at 900° F.

Thereafter, the mass is allowed to cool. This produces a relatively hard homogeneous mass which is then crushed and screened to retain those particles which are between 20 and 80 mesh. These particles are then placed in the hopper 10 and are used as the composition 11.

If the preferred composition is regarded as having the sodium silicate included therein as one of its ingredients, the proportions of ingredients that are present by weight is as follows:

|  | Percent |
|---|---|
| Fe₃O₄ | 32.80 |
| FeMn | 36.20 |
| SiMn | 11.84 |
| FeMo | 2.18 |
| Lamp black | 0.28 |
| Sodium silicate | 16.70 |
|  | 100.00 |

The sodium silicate functions primarily as a binder for binding together the ingredients of the mix and at the time of use of the composition contributes to the formation of the slag. It is doubtful whether it contributes any silicon to the weld deposit, and for this reason it has heretofore been described as merely an adhesive.

In using this composition, instead of using a mild steel welding wire for the electrode 13, a high carbon welding wire is used having a carbon content of from .60 to .65%. While high carbon wire is preferred, low carbon wire may be used successfully. Carbon range of the wire can be 0.0 to 1.2%. The electrode or wire used is 5/32″ in diameter and the orifice is 1/4″ in diameter. Under these circumstances I find there will be deposited on the work W approximately one pound of "flux" or composition 11 to each pound of wire or electrode 13.

It will be appreciated that in the above-described composition the iron oxide is magnetizable. The ferromolybdenum is also magnetizable. The magnetizable properties of these ingredients which are thoroughly mingled with and intimately bonded with the other ingredients causes the composition to adhere to the sides of the wire 13 whenever current is flowing through the wire to the arc that is drawn between the end of the electrode and the work. In addition to supplying the magnetizable property the iron oxide contributes to the formation of a proper slag on the deposit. The ferromanganese functions to supply manganese to the deposit and also functions as a de-oxidizer. The silicomanganese supplies manganese to the weld and also functions to supply silicon to the slag and weld deposit. The ferromolybdenum in addition to possessing its magnetizable property functions as an alloy transfer to the weld and also contributes to the formation of the desirable slag. The lamp black functions primarily as an arc stabilizer as it is very doubtful whether the lamp black supplies carbon to the deposit. The sodium silicate, after functioning as a binder for the ingredients, contributes to the slag on the deposit and silicon in the weld deposit.

The exact nature of the deposited metal varies considerably, depending upon a number of factors such as the amount of current employed and the length of the arc that is drawn and maintained between the end of the electrode and the work. A typical chemical analysis of the deposited metal will usually have the following ingredients within the following range:

| Manganese | Between 10 and 16% |
|---|---|
| Silicon | Between .3 and 1.5% |
| Molybdenum | Between .20 and 3% |
| Carbon | Between .15 and 1.2% |

Balance iron.

The deposited metal is in the nature of an austenitic manganese steel which will have a hardness of between 80 to 90 on the B scale of the Rockwell hardness testing machine. It will work-harden up to as high as 50 on the C scale of the Rockwell hardness testing machine.

In the above composition the ferromolybdenum ingredient may be regarded somewhat as optional in that it is possible to omit this ingredient entirely. Its presence is usually desired as it assists in preserving the austenitic structure of the metal in the deposit. When the ferromolybdenum is entirely omitted the composition of ingredients entering the dry mix may be substantially as follows:

|  | Percent |
|---|---|
| Fe₃O₄ | 40.40 |
| FeMn | 44.71 |
| SiMn | 14.55 |
| Lamp black | 0.34 |
|  | 100.00 |

It is also possible to substitute nickel for the ferromolybdenum and when such a substitution is made in the ingredients entering the dry mix are preferably present in the following proportions by weight:

| | Percent |
|---|---|
| Fe₃O₄ | 37.34 |
| FeMn | 41.32 |
| SiMn | 13.44 |
| Ni shot | 7.59 |
| Lamp black | 0.31 |
| | 100.00 |

The composition embodying the present invention may be used by different welders with substantially equal results insofar as spattering in the course of welding is concerned. The desirable typical ripple that is obtained in electric welding is obtainable with this composition and adequate penetration can be secured with the work W. The deposit is relatively free of blow-holes and the slag formed on the deposit can be readily removed. There seems to be little tendency for the slag to cling to the sides of the deposited bead so that when the weld or deposit has cooled the slag may be readily removed, leaving a clean homogeneous deposit of austenitic manganese steel on the work.

By the use of the method and composition above described it is possible to deposit austenitic manganese steels on the work very rapidly and secure a fast build-up which is very much more rapid than when it is attempted to deposit manganese steels by means of a single electrode or welding wire.

Various changes may be made in the details of construction and the steps of the process without departing from the spirit and scope of the invention as defined by the appended claims.

I claim:

1. A composition to be fed into an arc weld along with a welding wire consisting of the following ingredients in substantially the following proportions by weight:

| | Percent |
|---|---|
| Fe₃O₄ | 39.34 |
| FeMn | 43.54 |
| SiMn | 14.16 |
| FeMo | 2.62 |
| Lamp black | .34 |

2. A composition to be fed into an arc weld along with a welding wire consisting of the following ingredients in substantially the following proportions by weight:

| | Percent |
|---|---|
| Fe₃O₄ | 39.34 |
| FeMn | 43.54 |
| SiMn | 14.16 |
| FeMo | 2.62 |
| Lamp black | .34 | and sodium silicate.

3. A composition to be fed into an arc weld along with the welding wire comprising the following ingredients in substantially the following proportions by weight:

| | Percent |
|---|---|
| Fe₃O₄ | 40.40 |
| FeMn | 44.71 |
| SiMn | 14.55 |
| Lamp black | .34 |
| | 100.00 |

4. A composition to be fed into an arc weld along with the welding wire comprising the following ingredients in substantially the following proportions by weight:

| | Percent |
|---|---|
| Fe₃O₄ | 39.34 |
| FeMn | 43.54 |
| SiMn | 14.16 |
| Lamp black | .34 | and less than 10% of one of the group consisting of ferromolybdenum and nickel.

5. The method of making an austenitic manganese steel weld deposit which consists of arc welding with a steel electrode and feeding into the weld along with the metal of the electrode, a composition having the following ingredients in approximately the following proportions by weight:

| | Percent |
|---|---|
| Fe₃O₄ | 39.34 |
| FeMn | 43.54 |
| SiMn | 14.16 |
| FeMo | 2.62 |
| Lamp black | .34 |

6. The method of making an austenitic manganese steel weld deposit which consists of arc welding with a steel electrode and feeding into the weld along with the metal of the electrode, a composition having the following ingredients in approximately the following proportions by weight:

| | Percent |
|---|---|
| Fe₃O₄ | 39.34 |
| FeMn | 43.54 |
| SiMn | 14.16 |
| FeMo | 2.62 |
| Lamp black | .34 | and sodium silicate.

7. The method of making an austenitic manganese steel weld deposit which consists of arc welding with a steel electrode and feeding into the weld along with the metal of the electrode, a composition having the following ingredients in approximately the following proportions by weight:

| | Percent |
|---|---|
| Fe₃O₄ | 40.40 |
| FeMn | 44.71 |
| SiMn | 14.55 |
| Lamp black | 0.34 |
| | 100.00 |

8. The method of making an austenitic manganese steel weld deposit which consists of arc welding with a steel electrode and feeding into the weld along with the metal of the electrode a composition having the following ingredients in approximately the following proportions by weight:

| | Percent |
|---|---|
| Fe₃O₄ | 39.34 |
| FeMn | 43.54 |
| SiMn | 14.16 |
| Lamp black | .34 | and less than 10% of one of the group consisting of ferromolybdenum and nickel.

9. A composition to be fed into an arc weld along with the welding wire including the following ingredients in approximately the following proportions by weight:

| | Percent |
|---|---|
| Fe₃O₄ | About 40 |
| FeMn | About 44 |
| SiMn | About 14 |
| Lamp black | About .34 |

10. A composition to be fed into an arc weld along with the welding wire consisting of the following ingredients in substantially the following proportions by weight:

| | Percent |
|---|---|
| Fe₃O₄ | 37.34 |
| FeMn | 41.32 |
| SiMn | 13.44 |
| Ni shot | 7.59 |
| Lamp black | 0.34 |
| | 100.00 |

11. A composition to be fed into an arc weld along with the welding wire consisting of the following ingredients in substantially the following proportions by weight:

| | Percent |
|---|---|
| $Fe_3O_4$ | 32.80 |
| FeMn | 36.20 |
| SiMn | 11.84 |
| FeMo | 2.18 |
| Lamp black | 0.28 |
| Sodium silicate | 16.70 |
| | 100.00 |

References Cited in the file of this patent

UNITED STATES PATENTS

| 1,974,732 | Andren | Sept. 28, 1934 |
| 2,021,628 | Larson | Nov. 19, 1935 |
| 2,026,467 | Hall | Dec. 31, 1935 |
| 2,102,891 | Faulkner | Dec. 21, 1937 |
| 2,435,198 | Browne | Feb. 3, 1948 |

FOREIGN PATENTS

| 608,270 | Great Britain | Sept. 13, 1948 |